United States Patent [19]

Manoukian et al.

[11] 4,097,818
[45] Jun. 27, 1978

[54] ADJUSTABLE ETALON LASER MODE SELECTOR AND METHOD OF ADJUSTMENT

[75] Inventors: Nubar Sahag Manoukian, San Jose; Thomas Frazier Johnston, Jr., Sunnyvale, both of Calif.

[73] Assignee: Coherent, Inc., Palo Alto, Calif.

[21] Appl. No.: 720,198

[22] Filed: Sep. 3, 1976

[51] Int. Cl.² ............................................. H01S 3/082
[52] U.S. Cl. .................................. 331/94.5 C; 350/287
[58] Field of Search ................... 331/94.5 C, 94.5 D, 331/94.5 M; 356/112; 350/286

[56] References Cited

U.S. PATENT DOCUMENTS 3,541,471  11/1970  Kaminow et al. .............. 331/94.5 C
3,775,699  11/1973  Cassels .......................... 331/94.5 C Primary Examiner—William L. Sikes
Attorney, Agent, or Firm—Limbach, Limbach & Sutton

[57] ABSTRACT

An adjustable etalon mode selector is mounted within the optical cavity of a laser and includes a pair of spaced prisms mounted along the optical axis of the cavity with the laser beam passing therethrough and means for selectively adjusting the spacing between the prisms in a manner such that the resonant frequency of the laser cavity and etalon combination remains constant during the adjustment of the prism spacing in order that a particular mode of the operating wavelength spectrum of the laser may be selected for output, without the adjustment modulating the cavity natural resonant frequency.

7 Claims, 3 Drawing Figures

ADJUSTABLE ETALON LASER MODE SELECTOR AND METHOD OF ADJUSTMENT

BACKGROUND OF THE INVENTION

The instant invention relates to laser technology and more particularly, to an adjustable etalon for selecting a single output mode from a plurality of such modes in a laser cavity.

The laser is widely recognized as a source of coherent light or energy which operates at a very specific wavelength. However, lasers actually may operate over a range of output wavelengths, referred to as the laser gain curve, centered on that specific nominal wavelength. For example, a helium-neon (HeNe) laser operating nominally at 6328 angstroms (A°) actually may operate anywhere within a gain curve having a frequency spread of approximately 1.5 Ghz, or 0.02 A° about the center point of the 6328 A° nominal wavelength. Since the laser cavity is type of Fabry-Perot interferometer, the energy output is not a continuum as suggested by the gain curve, but includes a number of frequency pass bands defined by the mirror spacing in the cavity. Specifically, the pass bands or axial modes are separated by $c/2l$, where $c$ equals the speed of light and $l$ equals the mirror spacing in the laser cavity. For example, for a one meter long cavity, the modes are separated by 150 Mhz. Accordingly, the actual laser output may be represented as a distribution of numerous discrete wavelengths, each separated from the next by such a mode spacing and the total number of output wavelengths distributed over the entire laser operating gain curve. For example, in a HeNe laser having an operating frequency spread of 1.5 Ghz and a one meter optical cavity, there are approximately 10 separate lines of output radiation separated by the 150 Mhz pass band spacing.

While for many applications the use of laser output radiation having such a described frequency spectrum is satisfactory, a number of other applications, such as high resolution spectroscopy and holography, require much narrower frequency distributions. This need for narrowing the output frequency spectrum has become particularly acute with the development of the broad-band, tunable dye laser. Such dye lasers are capable of operation over a relatively broad range of output wavelengths and require, for maximum usefulness, some means for reducing the bandwidth of the output, preferably to a single axial mode. It is also desirable that means be provided for selecting such a single axial mode at any point within the full frequency spectrum of the laser output. This function conventionally is performed by the use of an optical element known as a Fabry-Perot etalon. In the prior art the types of etalon known include the solid type comprising a block of glass or other similar optical material having opposite faces accurately parallel to one another, and the air- or gas-spaced type. In either of these types of etalons, the structure includes two accurately parallel surfaces inclined very slightly to a normal to the optical path and through which the optical path passes. The etalon parallel surfaces are appropriately spaced to form a resonant cavity therebetween, such that certain frequencies of the beam energy are transmitted through the etalon, while others are internally reflected by the etalon surfaces off the laser cavity optical axis and thus out of the beam passing through the etalon.

When etalons are tilted, as is necessary to prevent them from coupling energy back within the laser cavity themselves, the inherent multiple internal reflections cause "walk-off" losses in the beam, as described in "Losses Introduced by Tilting Intra-Cavity Etalons" by Walter R. Leeb, Applied Physics 6, 267–72 (1975), and references cited therein. The well known solid etalon, because of its index of refraction being larger than unity, and its relatively lesser spacing between the reflective surfaces, has been found to have low walk-off losses but also possess no means for rapid variation of the spacing between the reflective surfaces as is necessary to tune the etalon. Conventional air- or gas-spaced etalons generally comprise a pair of plate-like glass members parallel to and aligned with one another and spaced apart from one another. In the air-spaced etalon the laser beam passes through both plates, the outwardly facing surfaces of those plates being provided with an anti-reflective coating and the mutually facing surfaces of the respective plates being provided with a partially reflective coating. By varying the spacing between the plate-like members of the etalon, the wavelength of the output radiation of the laser may be adjusted. However, with this conventional air-spaced etalon the larger physical spacing of the plates (for the same optical spacing between them) and the larger angle between the internal ray and the optical axis results in relatively large walk-off losses, such losses often being greater than is permissible for use with certain types of lasers, such as dye lasers. An improvement to the conventional air-spaced etalon is disclosed in Cassels U.S. Pat. No. 3,775,699 in which the optical elements comprise a pair of spaced prisms with the outwardly facing surfaces of those prisms inclined at Brewster's angle to avoid the necessity of using an anti-reflection coating on those surfaces. In this tilted prism type etalon the laser beam passes through the gap between the two prisms in a direction nearly normal to the two mutually facing surfaces of the two prisms.

A further substantial improvement in air-space etalons is disclosed in the co-pending application, Ser. No. 692,537 filed June 3, 1976 to Anthony D. Berg entitled "Etalon Laser Mode Selector" and assigned to the common assignee of this application. In the Berg application an etalon is disclosed which comprises two spaced prisms placed in the optical path of a laser cavity. The surfaces of the two prisms which face outwardly of the etalon along the optical axis are inclined at a very small angle to a normal to the optical axis, and the surface of each prism which is adjacent and facing the other prism is inclined at an angle relative to the cavity optical axis that is generally equal to Brewster's angle for the laser nominal wavelength and the prism material. This structure provides several benefits described in that application and is "tunable" for selecting one of a plurality of operating modes from the laser beam by means of moving the prisms toward or away from one another. Such adjustment in the prism spacing is disclosed as being effected by the application of a selectively adjustable electrical potential to the piezo-electric members to which the prisms are mounted.

While the etalon structure disclosed in the Berg application demonstrated substantial benefits over the prior art etalon structures, it was found that the conventional technique of translating the etalon prisms along the optical axis provided not only the desired adjustment of the output mode of the laser but also provided a highly undesirable additional source of frequency modulation of the laser beam. The cause of this undesired modulation was that translation of the prisms along the optical axis caused simultaneous variation in the optical path length in the laser cavity outside the etalon, the optical path length in the air space between the prisms and the optical path length through the prism being moved, (such prism having an index of refraction substantially different from that of the free air path), as is apparent from the geometry of that etalon. This undesired cavity frequency modulation becomes a great problem when attempting to use such an etalon in precision spectroscopy, such as may now be performed by a precision-controlled, tunable dye laser.

SUMMARY OF THE INVENTION

To solve the foregoing problems, it is an object of the present invention to provide an adjustable etalon comprising a pair of spaced prisms which is adjustable for selecting different modes of the operating wavelength output of the laser in a manner such that the resonant frequency of the laser cavity and etalon combination remains constant during such adjustment.

Briefly, the invention comtemplates a Fabry-Perot etalon mounted within the optical cavity of the laser and comprising a pair of spaced prisms mounted along the optical axis of the cavity with a laser beam passing therethrough. Each such prism has a first surface facing outwardly of the etalon and inclined at a slight angle to a normal to the optical axis, these prism first surfaces comprising the etalon reflecting surfaces which define the resonant frequency of the etalon. Each such prism also has a second surface optically adjacent and spaced from the second surface of the other such prism, each such second surface being inclined an angle relative to the cavity optical axis as approximately equal to Brewster's angle for the laser nominal wavelength. The etalon further comprises means for selectively adjusting the spacing between the prisms in a manner such that the resonant frequency of the laser cavity and etalon combination remains constant during such adjustment of the prism spacing.

BRIEF DESCRIPTION OF THE DRAWINGS

The invention having been generally described, a specific embodiment thereof will be discussed in detail with reference to the accompanying drawings in which.

DESCRIPTION OF A PREFERRED EMBODIMENT

Figure 1:
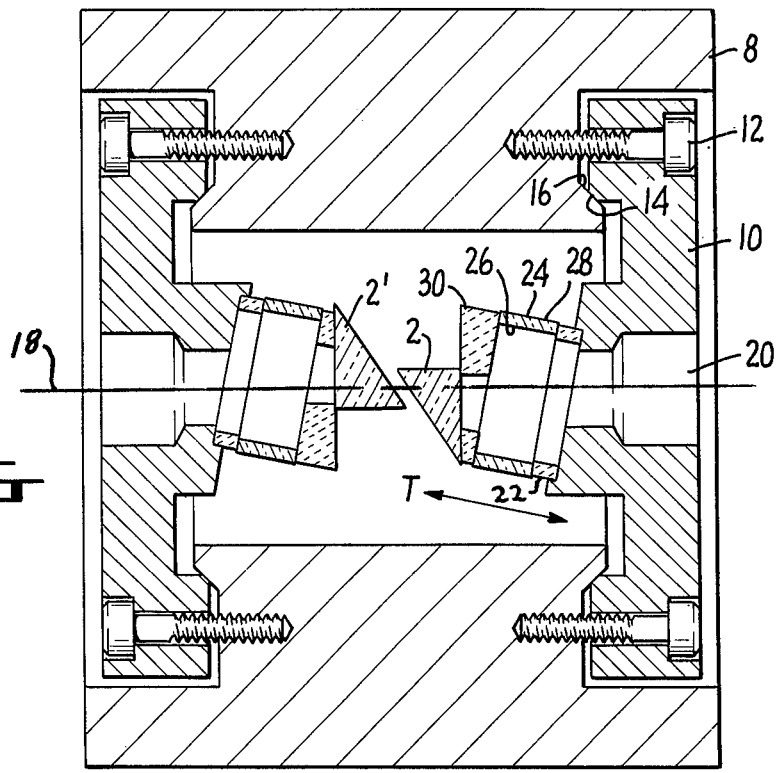
FIG. 1 is a vertical sectional view taken along the optical axis of the etalon of this invention.

The basic structure of the etalon of this invention is that disclosed in the co-pending application to Anthony D. Berg, entitled "Etalon Laser Mode Selector" and having an assignee in common with the present application. As in the Berg application, a preferred embodiment of the etalon of this invention is illustrated in its entirety in the view of FIG. 1, which represents a vertical section taken along the axis of the etalon. The two prisms comprising this etalon, and the direction of translation of such prisms, are illustrated schematically on a larger scale in FIG. 2. In all illustrations the separation between the prisms is greatly exaggerated for clarity of illustration.

The etalon of this embodiment, which is generally symmetrical both longitudinally and about a vertical plane through the optical axis, comprises essentially two spaced prisms 2 and 2', which are formed of a suitable material such as fused silica. Due to the longitudinal symmetry of this preferred embodiment of the etalon, about a plane normal to the optical axis, the mounting structure and the prism 2 associated with the right side of the etalon will be described in detail with the understanding that the prism 2' and its associated mounting structure on the left side of the etalon are substantially identical thereto.

The mounting for the prism 2 includes angularly adjustable mounting plate 10 which is held in engagement with housing 8 by a plurality of adjustable mounting bolts 12 extending through the plate 10 and tapped into the housing 8. By virtue of the engagement of annular lip 14 of plate 10 with the conically sloped surface 16 of the housing 8, differential tightening and loosening of the various mounting bolts 12 may serve to adjust the angular relationship between the plate 10 and the housing 8, as may be required for optical alignment.

Generally centered along the optical axis 18 of the etalon is an optical passage 20 provided through plate 10. Generally concentric with this passage 20 and at an angle with respect to the optical axis 18, one end of a cylindrical glass ring 22 is affixed to the plate 10. Affixed to the opposite end of the ring 22 is a cylindrical member 24 of piezo-electric material affixed by one of its ends coaxially with the glass ring 22. Electrically conductive surfaces 26 and 28 are formed, respectively, on the inner and outer surfaces of the cylindrical member 24 for attachment of electrical wires thereto, for purposes to be described below. At the opposite end of the cylindrical piezo-electric member 24 is attached one side of a wedge-shaped annular member 30 formed of fused silica having thermal characteristics similar to those of prism 2. On the opposite side of the wedge-shaped member 30 is attached the prism 2. The angle of the wedge of member 30 is selected to compensate for the angular mounting of glass ring 22 with respect to the optical axis.

Figure 2:
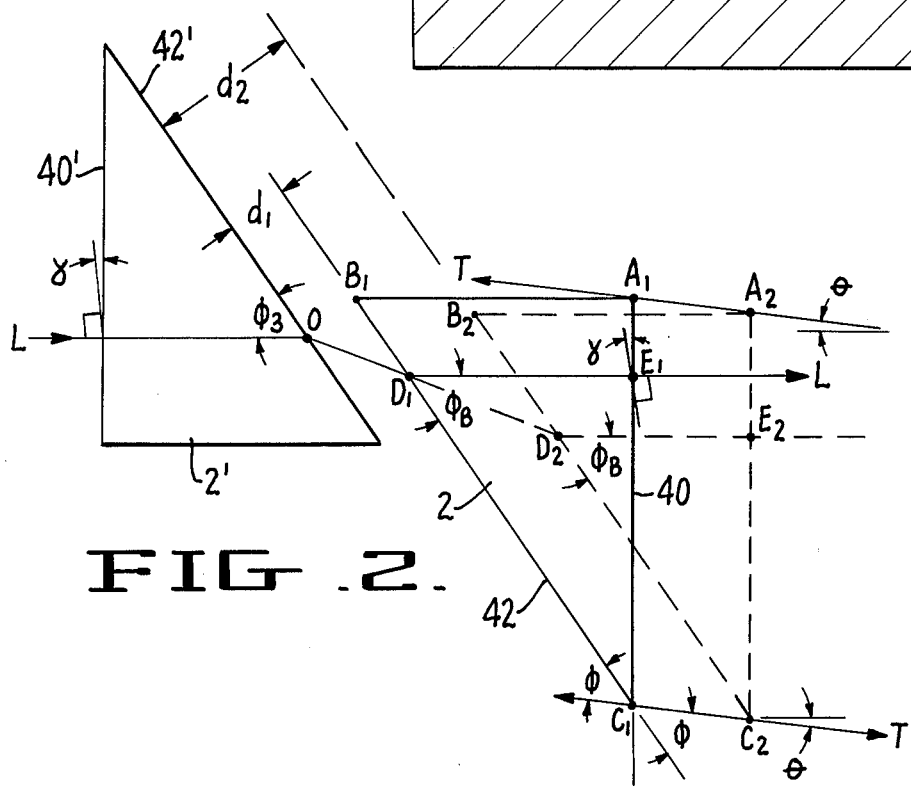
FIG. 2 illustrates schematically the general configuration and geometrical relationships between the optical prisms of this invention and their directions of adjustment.

A schematic illustration of the two prisms 2 and 2' in FIG. 2 better illustrates relationships between the two prisms and their relationship with the laser optical path, L. For purposes of this discussion, it will be assumed that the laser beam enters the etalon through the outwardly facing first surface 40' of prism 2' and then exits that prism through second surface 42'. The beam then enters prism two through its second surface 42 and then exits that prism and the etalon through outwardly facing first surface 40, which is parallel to first surface 40'. For purposes of simplicity in description the second surfaces 42 and 42' of the respective prisms, which face one another and are thus adjacent one another along the optical path of the laser cavity, will be referred to as the "optically adjacent" surfaces. These optically adjacent surfaces 42 and 42' are initially spaced from one another a distance $d_1$, which preferably is on the order of about 1 millimeter.

In FIG. 2, it may be seen that the outwardly facing first surface 40' of prism 2' is inclined at a slight angle relative to a normal to the beam, which is following the optical axis of the laser cavity. This angle $\delta$ is preferably on the order of a very few milliradians and desirably is just the minimum angle necessary to prevent coupling of the laser energy back into the cavity from surface 40'. Outwardly facing first surface 40 of prism 2 is similarly inclined at such an angle γ. The second surface 42' of the prism is also inclined at an angle to first surface 40' and at an angle $\zeta_\beta$ with respect to the optical axis. Preferably, the angle of inclination $\zeta_\beta$ of second surface 42 with respect to the laser cavity optical axis is generally equal to Brewster's angle for the prism material at the nominal radiation wavelength of the laser. This Brewster angle cut of the prism second surfaces 42 and 42' eliminates the need for any anti-reflection coating on those surfaces and thus improves the efficiency of the system. It is desirable, however, to provide a reflective coating, such as a 20% broadband reflective coating, on the outwardly facing first surfaces 40 and 40' of the prisms.

The spacing or air gap between the surfaces 42 and 42' may be kept small, on the order of about one millimeter, thus minimizing any offset between the incoming beam and the outgoing beam. Further, by virtue of the entry of the beam through one surface of the prism nearly normal to that surface, its exit from another surface at Brewster's angle and the maintenance of the very small air gap between the two prisms, the system may be seen to be essentially achromatic, since this small path link in the air gap reduces the effect of any dispersion in the prism to a negligible amount. Also as a result of the Brewster angle cut of the second surfaces 42 and 42' and the very small spacing between them relative to the overall thickness of the etalon, this etalon possesses substantially the same low walk-off loss characteristics as a solid etalon of comparable overall thickness. However, by virtue of the separate nature of the two prisms forming the etalon, the spacing between the two prisms and thus between the two reflective etalon surfaces 40 and 40' may readily be adjusted to "tune" the etalon. To "tune" the etalon of this embodiment to effect the selection of different wavelengths passed by the etalon either of the prisms, or both of them, may be moved toward and away from one another. Such movement may be effected by the piezo-electric members supporting the prisms. By selective application of varying electrical potential to the contacts 26 and 28 or 26' and 28' of the piezo-electric members 24 and 24', the length of those members may be selectively varied thus moving the prisms 2 and 2' toward or away from one another. Since such piezo-electric members are capable of accurate calibration for length differential relative to input potential, it is possible to obtain a very accurate amount as well as a very fast rate of movement of the prisms to the application of such selectively adjustable potential. By varying the spacings between the two facing prisms 2 and 2', the spacing between the two reflecting etalon surfaces 40 and 40' likewise is varied, thus varying the (c/2l) resonant frequency of the etalon. By varying the resonant frequency of the etalon, selectively different frequencies or wavelengths of light are transmitted through the etalon and selective other such frequencies or wave lengths are reflected by the etalon off the laser optical axis so that the wavelength of the output radiation of the laser may be limited to axial modes within the selected transmitted wavelengths, thus controlling the output of the laser over the preselected spectral range.

However, as is illustrated on a greatly exaggerated scale in FIG. 2, any movement of the prisms results in a change in the optical path length not only in the laser cavity external to the etalon but also in the optical path between the prisms and through the prism being moved, in this case, prism 2. As indicated, when the prism 2 is moved from a distance $d_1$ from prism 2' to a distance $d_2$ (shown in phantom), the optical air path length between the two prisms increases from the line $OD_1$ to the line $OD_2$. Correspondingly, the path length of the laser beam through prism 2 decreases from the length $D_1E_1$ to the length $D_2E_2$.

Figure 3:
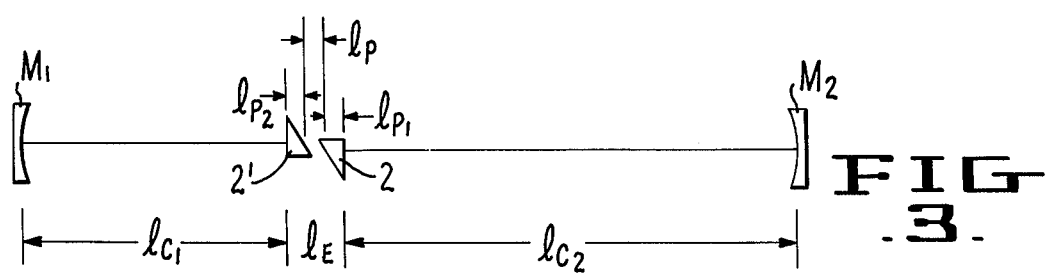
FIG. 3 is a schematic representation of a laser cavity including the etalon of this invention.

The net effect of these changes on the overall laser cavity is illustrated in FIG. 3 in which the total optical path length in the laser is the sum of the optical path length $l_E$ through the etalon and the path length $l_{C1}$ and $l_{C2}$ in the laser cavity external to the etalon. As described above, the optical path length $l_E$ through the etalon comprises the path length $l_{p1}$ through prism 2, path length $l_A$ through the air space between the prisms and the path length $l_{p2}$ through the prism 2'. Thus, while the initially obvious direction of choice for translation of the prisms was along or parallel to the optical axis of the laser cavity, it was found that such translation not only effected selection of different laser operating modes by adjustment of the etalon, but also caused a modulation of the total effective optical path length of the laser, both within and without the etalon. This modulation of the overall laser cavity optical path length thus caused an undesired additional modulation of the resonant frequency of the cavity. Thus, while for many applications such undesired additional modulation of the laser resonant frequency has been tolerated as a necessary and inherent condition for the use of such an adjustable etalon, for precision work such as spectroscopy with a dye laser it was necessary to create some mean for adjusting the etalon without the undesired cavity modulation. The problem of such cavity modulation is especially acute in a precision frequency stabilized dye laser where modulation, or dither, of the etalon is required to lock the etalon position onto the laser oscillating frequency. For such an application it is particularly essential that the etalon be adjustable without modulating the laser cavity as a whole. One structure for achieving this modulation-free adjustment is illustrated in FIG. 1 and explained schematically in FIG. 2.

The adjusting means for the preferred embodiment of this etalon comprise essentially a mounting configured in such a manner to hold the two prisms in their above described angular relationships relative to the cavity optical path while translating either or both of the prisms in a predetermined direction relative to the optical axis such that the changes in the lengths of the optical path through the prism material of the etalon, in the air space between the two prisms of the etalon and in the laser cavity external to the etalon all compensate one another such that the overall laser cavity optical path length experiences no modulation at all during the translation. Thus, by selecting the proper direction of translation, each of the three segments of the optical path length may be varied (i.e., or modulated), but the overall laser cavity optical path length remains constant and thus without frequency modulation. This direction of translation is indicated by the arrows T in FIGS. 1 and 2.

One of the important aspects of this invention is the discovery of the inter-relationship of the direction of translation T of the prism with the optical path through the prism and the Brewster's angle surface 42 of the prism. Specifically, it has been found that to obtain adjustment of the output mode of the etalon with essentially no modulation of the laser cavity resonant frequency the direction of translation T should be in the general direction of the optical axis of the cavity along a line co-planar with the optical axis through the etalon and at an angle $\zeta$ of about 45° to the Brewster angle surface of the prism. This angular relationship is illustrated in FIG. 2, in which it can be seen that the optical path L through prism 2 at the respective positions of $d_1$ and $d_2$ from prism 2' is defined by the line extending between points $D_1E_1$ and $D_2E_2$, respectively. As previously described, the lines $D_1E_1$ and $D_2E_2$ are at an angle $\Omega_\beta$, approximately Brewster's angle, with respect to second surface 42 of prism 2. This angular relationship results in the direction of translation T for essentially no cavity modulation being at an angle $\theta$ with respect to the laser optical axis.

From the foregoing it can be seen that the orientation of the piezo-electric member 24 at the appropriate translational angle provides for the desired direction of selective movement of the prism to effect its adjustment. Since it is desired to maintain the angular orientation of the faces 40 and 42 of prism 2 with respect to the laser optical axis, the wedge-shaped glass member 30 is interposed between the piezo-electric member 24 and the prism 2 to correct for the angular orientation of the piezo-electric member.

As an example, the case of a dye laser operating at a nominal wavelength of 6,000 A° may be considered with an etalon whose prisms at that wavelength have a Brewster's angle of 55.59°. In this example, the angle $\theta$ between the direction of translation of the prism and the laser optical axis is 10.59° for adjustment of the etalon with essentially no modulation of the laser cavity resonant frequency.

It has been found that Brewster's angle ($\phi_B$) for conventional prism material such as fused silica remains substantially constant at about 56° for virtually all of the visible spectrum from 450 nm to 750 nm. However, it has also been found that variations of as much as 3° to 5° either side of Brewster's angle for the relationship between surface 42 and the optical path through the prism 2 may be tolerated with relatively little loss in optical efficiency. Accordingly, appropriate angles $\theta$ between the direction of translation and the laser cavity optical axis of as much as 15° may be tolerated with the resonant frequency of the laser cavity and etalon combination remaining substantially constant during the adjustment of the prism spacing. In fact, it has been found that translation directions of as much as 15° either side of the preferred angle (45° to the Brewster angle surface) cause modulations only on the order of 1 Mhz and are thus suitable for some applications. While this embodiment, for purposes of simplifying the description thereof, has been discussed with respect to the movement of only a single prism of the etalon, obviously similar principles apply to the simultaneous or sequential translation of both prisms.

While the foregoing illustrates a preferred embodiment of the structure of this invention, numerous variations in the structure will be readily apparent to those skilled in the art. All such variations are considered to be fully within the scope of the invention herein and, accordingly, the invention is not to be limited to the specific structure but is to embrace all equivalents within the scope of the claims appended hereto.

What is claimed is:

1. An adjustable etalon mode selector mounted within the optical cavity of a laser, said etalon comprising a pair of spaced prisms mounted along the optical axis of said cavity with the laser beam passing therethrough, each said prism having a first surface facing outwardly of said etalon and inclined at a slight angle to a normal to said optical axis, and each said prism having a second surface optically adjacent and spaced from the second surface of the other said prism, each said second surface being inclined at an angle relative to said cavity optical axis that is generally equal to Brewster's angle for the laser nominal wavelength, and means for selectively adjusting the spacing between said prisms while maintaining the resonant frequency of the laser cavity and etalon combination remains substantially constant during said adjustment of said prism spacing, whereby different modes of the operating wavelength spectrum of the laser may be selected for output without such adjustment modulating the natural resonant frequency of the cavity and etalon combination.

2. An adjustable etalon according to claim 1 wherein said prism spacing adjusting means comprises means for translating at least one of said prisms longitudinally of said cavity in a predetermined direction relative to the optical axis thereof such that the respective changes in lengths of the optical paths through said prism material, to the medium between said prisms and within the laser cavity external to the etalon substantially cancel one another.

3. An adjustable etalon according to claim 2 wherein said predetermined direction of prism translation is along a line coplanar with said optical axis through said etalon and at an angle less than about 15° from alignment with said optical axis through said prism.

4. An adjustable etalon according to claim 3 wherein said predetermined direction of prism translation is at an angle of about 45° to said second surface of said prism.

5. A method for obtaining selectively different modes of the operating wavelength spectrum of a laser for output by selectively adjusting an etalon mode selector mounted within the optical cavity of such laser, said etalon comprising a pair of spaced prisms mounted along the optical axis of said cavity with the laser beam passing therethrough, each said prism having a first surface facing outwardly of said etalon and inclined at a slight angle to a normal to said optical axis, and each said prism having a second surface optically adjacent and spaced from the second surface of the other said prism, each said second surface being inclined at an angle relative to said cavity optical axis that is generally equal to Brewster's angle for the laser nominal wavelength, said method comprising selectively adjusting the spacing between said prisms by translating at least one of said prisms longitudinally of said cavity in a predetermined direction relative to the optical axis thereof such that the respective changes in lengths of the optical paths through said prism material, through the medium between said prisms and in the laser cavity external to said etalon substantially cancel one another to maintain substantially constant the resonant frequency of the laser cavity and etalon combination during said adjustment.

6. The method of obtaining selectively different modes of the operating wavelength spectrum of a laser according to claim 5 wherein said adjustment comprises translation of said prism along a line coplanar with said optical path through said etalon and at an angle less than about 15° from alignment with said optical axis through said prism.

7. The method of obtaining selectively different modes of the operating wavelength spectrum of a laser according to claim 6 wherein said predetermined direction of prism translation is at an angle of about 45° to said second surface of said prism.

* * * * *